US010507621B2

(12) United States Patent
Zhou et al.

(10) Patent No.: US 10,507,621 B2
(45) Date of Patent: Dec. 17, 2019

(54) POLYURETHANE COMPOUND FOR PRODUCING AN INTEGRATED INSULATION COMPONENT

(71) Applicant: BASF SE, Ludwigshafen (DE)

(72) Inventors: Yang Chun Zhou, Shanghai (CN); Wei Han, Shanghai (CN); Joe Gu, Shanghai (CN); Xingang Wang, Shanghai (CN); Diao Qing, Shanghai (CN)

(73) Assignee: BASF SE, Ludwigshafen (DE)

( * ) Notice: Subject to any disclaimer, the term of this patent is extended or adjusted under 35 U.S.C. 154(b) by 235 days.

(21) Appl. No.: 15/317,182

(22) PCT Filed: May 29, 2015

(86) PCT No.: PCT/EP2015/061942
§ 371 (c)(1),
(2) Date: Dec. 8, 2016

(87) PCT Pub. No.: WO2015/189045
PCT Pub. Date: Dec. 17, 2015

(65) Prior Publication Data
US 2017/0136711 A1 May 18, 2017

(30) Foreign Application Priority Data
Jun. 11, 2014 (WO) ................ PCT/CN2014/079676

(51) Int. Cl.
*B29C 67/24* (2006.01)
*B29C 35/02* (2006.01)
(Continued)

(52) U.S. Cl.
CPC .............. *B29C 67/246* (2013.01); *B29B 7/88* (2013.01); *B29C 33/62* (2013.01); *B29C 35/02* (2013.01);
(Continued)

(58) Field of Classification Search
CPC ... B29C 67/246; B29C 37/0028; B29C 33/62; B29C 35/02; B29C 37/0067;
(Continued)

(56) References Cited

U.S. PATENT DOCUMENTS 4,581,387 A 4/1986 Werner et al.
4,631,298 A * 12/1986 Presswood ......... C08G 18/6529
252/182.13
(Continued)

FOREIGN PATENT DOCUMENTS

CA 1277471 C 12/1990
CN 2459597 Y 11/2001
(Continued)

OTHER PUBLICATIONS

Polyurethane Handbook, Günther Oertel, 2nd. Edition, Hanser Publishers, Munich 1993, chapter 3.1.
(Continued)

*Primary Examiner* — Nahida Sultana
(74) *Attorney, Agent, or Firm* — Armstrong Teasdale LLP

(57) ABSTRACT

The present invention relates to a process for producing an insulation component in which an insulating foam material is placed in a mold and in which (a) isocyanates, (b) polymeric compound having hydrogen atoms reactive towards isocyanate, (c) chain extenders and/or crosslinkers, and (d) catalysts are mixed to give a reaction mixture and the reaction mixture is injected into the mold and cured to form a seamless outer material enclosing the insulating foam wherein the average functionality of the polyols (b) and the chain extenders and/or crosslinkers (c) and the isocyanates (a) is greater than 2.2. The invention further relates to an insulation component obtainable by such a process and a door or wall component for cold storage that is made from that insulation component.

14 Claims, 1 Drawing Sheet

(51) Int. Cl.
| | |
|---|---|
| *B29C 33/62* | (2006.01) |
| *B29C 44/56* | (2006.01) |
| *C08J 9/36* | (2006.01) |
| *B29B 7/88* | (2006.01) |
| *B29C 37/00* | (2006.01) |
| *C08G 18/08* | (2006.01) |
| *C08G 18/16* | (2006.01) |
| *C08G 18/32* | (2006.01) |
| *C08G 18/48* | (2006.01) |
| *C08G 18/76* | (2006.01) |
| *B29L 31/00* | (2006.01) |
| *B29K 75/00* | (2006.01) |
| *B29K 275/00* | (2006.01) |
| *B29K 105/00* | (2006.01) |
| *B29K 675/00* | (2006.01) |
| *C08G 101/00* | (2006.01) |

(52) U.S. Cl.
CPC ...... *B29C 37/0028* (2013.01); *B29C 37/0067* (2013.01); *B29C 44/5681* (2013.01); *C08G 18/14* (2013.01); *C08G 18/168* (2013.01); *C08G 18/3206* (2013.01); *C08G 18/4829* (2013.01); *C08G 18/4837* (2013.01); *C08G 18/7671* (2013.01); *C08J 9/365* (2013.01); *B29K 2075/00* (2013.01); *B29K 2105/0014* (2013.01); *B29K 2275/00* (2013.01); *B29K 2675/00* (2013.01); *B29K 2995/0015* (2013.01); *B29L 2031/7622* (2013.01); *C08G 2101/005* (2013.01); *C08G 2101/0025* (2013.01); *C08J 2375/04* (2013.01); *C08J 2475/04* (2013.01).

(58) Field of Classification Search
CPC .. B29C 44/5681; C08G 18/168; C08G 18/14; C08G 18/7671; C08G 18/4829; C08G 18/4837; C08G 18/3206; C08G 2101/005; C08G 2101/0025; B29B 7/88; B29K 2675/00; B29K 2105/0014; B29K 2275/00; B29K 2075/00; C08J 2475/04; C08J 2375/04; C08J 9/365; B29L 2031/7622
See application file for complete search history.

(56) References Cited

U.S. PATENT DOCUMENTS

| | | | | |
|---|---|---|---|---|
| 4,764,537 | A | | 8/1988 | Horn et al. |
| 5,047,441 | A | * | 9/1991 | Lind .................. C08G 18/4063 521/157 |
| 5,300,264 | A | | 4/1994 | Wolfrum |
| 5,346,928 | A | * | 9/1994 | De Vos .............. C08G 18/3218 521/117 |
| 6,762,273 | B2 | * | 7/2004 | Dewanjee .......... A63B 37/0003 473/371 |
| 7,244,802 | B2 | * | 7/2007 | Dewanjee .......... A63B 37/0003 473/374 |
| 7,288,677 | B2 | * | 10/2007 | Lee ........................ C07C 211/12 564/269 |
| 7,964,695 | B2 | * | 6/2011 | Lee ........................ C07C 211/09 528/44 |
| 7,985,779 | B2 | * | 7/2011 | Vleghert ................. A63B 39/00 156/245 |
| 8,143,365 | B2 | * | 3/2012 | Brown .................... C08G 18/10 264/328.6 |
| 2006/0084709 | A1 | * | 4/2006 | Dobransky ........ C08G 18/4018 521/131 |
| 2007/0216056 | A1 | * | 9/2007 | Hanada ................ B29C 44/569 264/45.1 |
| 2008/0064778 | A1 | * | 3/2008 | Hasegawa .......... C08G 18/4879 521/137 |
| 2013/0042659 | A1 | * | 2/2013 | Beatty .................. C05G 3/0029 71/64.02 |
| 2014/0242313 | A1 | * | 8/2014 | Vogel ...................... B29C 44/42 428/36.5 |

FOREIGN PATENT DOCUMENTS

| | | |
|---|---|---|
| DE | 36 07 447 A1 | 9/1987 |
| EP | 153 639 A2 | 9/1985 |
| EP | 1022105 A1 | 7/2000 |
| WO | 2014/108067 A1 | 7/2014 |

OTHER PUBLICATIONS

Polyurethane Handbook, Günther Oertel, 2 nd. Edition, Hanser Publishers, Munich 1993, Chapter 3.4.4.
Polyurethane Handbook, Günther Oertel, 2 nd. Edition, Hanser Publishers, Munich 1993, Chapter 3.4.6 to 3.4.11.
Polyurethane Handbook, Günther Oertel, 2nd. Edition, Hanser Publishers, Munich 1993, Chapter 6.
ISR for PCT/EP2015/061942 dated Aug. 21, 2 pages.

* cited by examiner

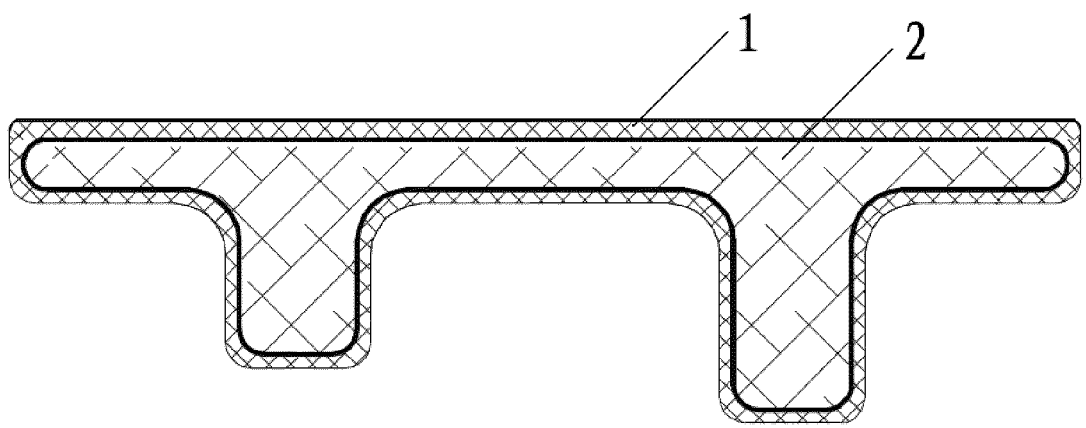

POLYURETHANE COMPOUND FOR PRODUCING AN INTEGRATED INSULATION COMPONENT

CROSS-REFERENCE TO RELATED APPLICATIONS

This application is a U.S. National Phase Application of PCT/EP2015/061942, filed May 29, 2015, which is incorporated herein by reference in its entirety.

The present invention relates to A process for producing of an insulation component in which an insulating foam material is placed in a mould and (a) isocyanates, (b) polymeric compound having hydrogen atoms reactive towards isocyanate, optionally (c) chain extenders and/or crosslinkers, (d) catalysts and optionally (e) other assistants and/or additives are mixed to give a reaction mixture and the reaction mixture is injected into the mould containing the insulation foam material and cured to form an seamless outer material enclosing the insulating foam wherein the average functionality of the polyols (b) and the chain extenders and/or crosslinkers (c) and the isocyanates (a) is more than 2.2. The invention further relates to an insulation component obtainable by such a process and the application of that insulation component as door or wall component for a cold storing device.

Traditional insulation component generally includes an inner insulation foam layer, a shell and a liner, with the shell and liner being pre-assembled together. The production of these insulation components requires several production steps and is relatively complicated time consuming and expensive. In addition the resulting insulation component is relatively heavy and difficult to transport and to assemble. Finally the outer surface contains many seams, the sealing effect is poor Patent Publication No. CN2459597Y discloses a refrigerator door structure (ie insulation component), comprising the use of plastic molding process to separately form the shell and the liner, using the extrusion molding process of the door, and then fix the 3 parts together to get the refrigerator door (insulation component), which, to some extent, reduces the pre-assembly process, but its body still contains door frame pieces, pre-assembly process is still complicated, and the presence of door frame pieces also reduces the esthetic appearance of the refrigerator door.

For the production of polyurethane parts the Reaction Injection Moulding process (RIM-process) has been well known and is for example disclosed in the "Polyurethane Handbook", edited by Günther Oertel, second edition, Hanser Publishers, Munich 1993, chapter 7. In the RIM process a polyurethane reaction mixture is introduced into a mould and by curing the material a finished polyurethane material can be obtained.

FIG. 1 depicts an insulation component of the present invention produced according to the Example where 1 denotes a single outer layer of hardened polyurethane enclosing insulating foam 2.

It was object of the present invention to provide a polyurethane system that suits for producing of an insulation component which can be applied as door or wall component for a cold storing device. Especially it was object of the present invention to provide a polyurethane system that has a good flowabillity and a short demould time and wherein the resulting polyurethane has good mechanical properties as high scratch resistance, and a high elasticity even at low temperatures below 0° C. Further it was object to provide a cooling element having a smooth surface.

This object of the present invention has been has been achieved by a process for producing of an insulation component in which an insulating foam material is placed in a mould and in which (a) isocyanates, (b) polymeric compound having hydrogen atoms reactive towards isocyanate, optionally (c) chain extenders and/or crosslinkers, (d) catalysts and optionally (e) other assistants and/or additives are mixed to give a reaction mixture and the reaction mixture is injected into the mould containing the insulation foam material and cured to form an seamless outer material enclosing the insulating foam wherein the average functionality of the polyols (b) and the chain extenders and/or crosslinkers (c) and the isocyanates (a) is more than 2.2.

The isocyanates (a) used for production of the inventive insulation component comprise the aliphatic, cycloaliphatic and aromatic di- or polyfunctional isocyanates known from the prior art (constituent a-1) and any desired mixtures thereof. Examples are diphenylmethane 4,4'-diisocyanate, diphenylmethane 2,4'-diisocyanate, the mixtures of monomeric diphenylmethane diisocyanates and higher polycyclic homologs of diphenylmethane diisocyanate (polymer MDI), tetramethylene diisocyanate, hexamethylene diisocyanate (HDI), the mixture of hexamethylene diisocyanates and higher polycyclic homologs of hexamethylene diisocyanate (polycyclic HDI), isophorone diisocyanate (IPDI), tolylene 2,4- or 2,6-diisocyanate (TDI) or mixtures of the isocyanates mentioned. The isocyanates may also be modified, for example by incorporation of uretdione, carbamate, isocyanurate, carbodiimide, allophanate and especially urethane groups.

In case that a special light stability is desired aliphatic and/or cycloaliphatic isocyanates as tetramethylene diisocyanate, hexamethylene diisocyanate (HDI), the mixture of hexamethylene diisocyanates and higher polycyclic homologs of hexamethylene diisocyanate (polycyclic HDI), isophorone diisocyanate (IPDI) are preferred. In another embodiment preference is given to using tolylene diisocyanate (TDI), diphenylmethane diisocyanate (MDI) and especially mixtures of diphenylmethane diisocyanate and polyphenylene polymethylene polyisocyanates (crude MDI) as isocyanates (a). In an especially preferred embodiment the isocyanate (a) comprises Diphenylmethandiisocyanate (MDI) like 4,4'-MDI, 2,4-MDI and or mixtures thereof and more preferred mixtures of diphenylmethandiisocyanate and polyphenylene polymethylene polyisocyanates having 3 or more aromatic rings each carrying an NCO-group. In another preferred embodiment the isocyanates (a) comprises modified MDI which has been modified for example by incorporation of uretdione, carbamate, isocyanurate, carbodiimide, allophanate or urethane groups.

The isocyanate component (a) can also be used in the form of isocyanate-containing isocyanate prepolymers. These polyisocyanate prepolymers are obtainable by reacting above-described polyisocyanates (a-1), for example at temperatures of 30 to 100° C., preferably at about 80° C., with polyols (a-2) to give the prepolymer. Preference is given to preparing the inventive prepolymers using 4,4'-MDI together with uretonimine-modified MDI and commercial polyols for example polyols based on polyesters or polyethers.

Polyols (a-2) are known to those skilled in the art and are described, for example, in the "Polyurethane Handbook", edited by Günther Oertel, second edition, Hanser Publishers, Munich 1993, chapter 3.1. The polyols (a-2) used are preferably the polyetherols or polyesterols described under b).

Optionally, customary chain extenders or crosslinkers are added to the polyols (a-2) mentioned in the course of preparation of the isocyanate prepolymers. Such substances are described hereinafter under c). The chain extender (a-3) used is more preferably 1,4-butanediol, dipropylene glycol and/or tripropylene glycol. The ratio of organic polyisocyanates (a-1) to polyols (a-2) and chain extenders (a-3) is preferably selected such that the isocyanate prepolymer has an NCO content of 10 to 28%, more preferably of 14 to 24%.

Polymeric compounds having hydrogen atoms reactive towards isocyanates (b) have a functionality of at least 2.2 and a molecular weight of at least 350 g/mol. It is possible to use all compounds which are known for polyurethane preparation and have at least two reactive hydrogen atoms and a molecular weight of at least 400 g/mol. These have, for example, a functionality of 2.2 to 8 and a molecular weight of 450 to 12000. For example, it is possible to use polyether polyamines and/or polyols selected from the group of the polyether polyols, polyester polyols or mixtures thereof.

The polyols used with preference are polyetherols, polycarbonate polyols and/or polyesterols having molecular weights between 350 and 12 000, preferably 400 to 6000, especially 450 to less than 3000, and preferably a mean functionality of 2.2 to 6, preferably 2.4 to 5. The polyols used most preferably are exclusively polyetherols.

The polyetherols usable in accordance with the invention are prepared by known processes. For example, they can be prepared by anionic polymerization with alkali metal hydroxides, for example sodium or potassium hydroxide, or alkali metal alkoxides, for example sodium methoxide, sodium or potassium ethoxide or potassium isopropoxide as catalysts, and with addition of at least one starter molecule having 2 to 8, preferably 2 to 6, reactive hydrogen atoms, or by cationic polymerization with Lewis acids such as antimony pentachloride, boron fluoride etherate inter alia, or bleaching earth as catalysts. It is likewise possible to prepare polyether polyols by double metal cyanide catalysis from one or more alkylene oxides having 2 to 4 carbon atoms in the alkylene radical. It is also possible to use tertiary amines as the catalyst, for example triethylamine, tributylamine, trimethylamine, dimethylethanolamine, imidazole or dimethylcyclohexylamine. For specific end uses, it is also possible to incorporate monofunctional starters into the polyether structure.

Suitable alkylene oxides are, for example, tetrahydrofuran, 1,3-propylene oxide, 1,2- or 2,3-butylene oxide, styrene oxide, and preferably ethylene oxide and 1,2-propylene oxide. The alkylene oxides can be used individually, in alternating succession or as mixtures.

Examples of useful starter molecules include: water, aliphatic and aromatic, optionally N-mono-, N,N- and N,N'-dialkyl-substituted diamines having 1 to 4 carbon atoms in the alkyl radical, such as optionally mono- and dialkyl-substituted ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamine, 2,3-, 2,4- and 2,6-tolylenediamine (TDA) and 4,4'-, 2,4'- and 2,2'-diaminodiphenylmethane (MDA) and polymeric MDA. Useful starter molecules also include: alkanolamines, for example ethanolamine, N-methyl- and N-ethylethanolamine, dialkanolamines, for example diethanolamine, N-methyl- and N-ethyldiethanolamine, trialkanolamines, for example triethanolamine, and ammonia. Preference is given to using polyhydric alcohols such as glycerol, trimethylolpropane; pentaerythritol, sorbitol, sucrose, and mixtures thereof as well as one or more of these starting substances together with twofunctional starting substances as ethanediol, 1,2- and 2,3-propanediol, diethylene glycol, dipropylene glycol, 1,4-butanediol, 1,6-hex under the provision that the average functionality of the polyol is at least 2.2, preferably 2.4 to 6, more preferably 2.5 to 5. The polyether polyols can be used individually or in the form of mixtures.

The polymeric compounds having at least two isocyanate-reactive hydrogen atoms (b) preferably comprise polyether polyols based on starter molecules having OH groups (b1) and polyether polyols based on a starter molecules having amino groups (b2).

The starter molecules having OH-groups for the production of the polyetherols (b1) preferably comprise trifunctional starter molecules as glycerol, trimethylolpropane or mixtures thereof. In general, the alkoxylation of constituent (b1) is executed in such a way that constituent (b1) has a number-average molecular weight of 350 g/mol to 8000 g/mol, preferably of 600 to 8000 g/mol and more preferably 2000 to 6000.

In a preferred embodiment, the polyol constituent (b2) comprises polyetherols obtained from the alkoxylation of amines like Toluenediamine or ethylenediamine.

Preferably the average molecular weight of compound (b2) is having a number-average molecular weight of 350 g/mol to 3500 g/mol, more preferably of 400 to 1000 g/mol and especially of 450 to 800 g/mol.

The proportion between compound (b1) and (b2) is not limited but preferably in the range of 1:20 to 20:1, more preferably 1:1 to 5 to 1.

In addition to compounds (b1) and (b2) in a preferred embodiment a trifunctional polyol obtained by alkoxylation of a trifunctional starter molecule as glycerol, trimethylolpropane or mixtures thereof, preferably trimehylolpropane, having an average molecular weight of 350 to 800 g/mol, preferably 350 to 600 g/mol and most preferably 400 to 600 g/mol can be applied as compound (b3). If compound (b3) is applied it is usually used in an amount of 1 to 20% by weight, preferably 2 to 15% by weight and most preferably 4 to 10% by weight based on the total weight of compound (b).

The chain extenders and/or crosslinkers c) used may be substances having a molecular weight of less than 350 g/mol, more preferably of 60 to 300 g/mol, chain extenders having 2 isocyanate-reactive hydrogen atoms and crosslinkers having 3 isocyanate-reactive hydrogen atoms. These can be used individually or preferably in the form of mixtures. Preference is given to using diols and/or triols having molecular weights of less than 350, more preferably of 60 to 300 g/mol. Examples of useful substances include aliphatic, cycloaliphatic and/or araliphatic or aromatic diols having 2 to 14, preferably 2 to 10, carbon atoms, such as ethylene glycol, 1,3-propanediol, 1,4-butanediol, 1,6-hexanediol, 1,10-decanediol and bis(2-hydroxyethyl)hydroquinone, 1,2-, 1,3-, 1,4-dihydroxycyclohexane, diethylene glycol, dipropylene glycol, tripropylene glycol, triols such as 1,2,4-, 1,3,5-trihydroxycyclohexane, glycerol and trimethylolpropane, and low molecular weight hydroxyl-containing polyalkylene oxides based on ethylene oxide and/or 1,2-propylene oxide and the aforementioned diols and/or triols as starter molecules. Alternatively primary and/or secondary amine group containing molecules can be used as chain extenders and/or crosslinkers (c). Examples for such amines are ethylenediamine or Diethyltoluenediamine (DETDA). These amine group containing cross linkers can be used as sole cross linker or together with OH-group containing chain extenders and/or crosslinkers. In one preferred embodiment the chain extender c) used most preferably is dipropylene glycol either alone or in mixtures with other chain extenders and/or cross linkers. Most preferably as chain extender and/or crosslinker c) Diethyltoluenediamine (DETDA) is used either in combination with other chain extenders and/or crosslinkers or more preferred as the only chain extender or crosslinker c).

Chain extenders and/or crosslinkers (c) can be used optionally. If chain extenders and crosslinkers (c) are applied in the inventive process they can be used in an amount of 1 to 60% by weight, based on the total weight of compounds (b) and (c). By varying the amount of chain extenders and crosslinkers as well as the molecular weight and functionality of the polyols the mechanical properties of the polyurethane materials obtained can be varied. So for example the application of a low amount of chain extenders as well as a the application of high molecular weight polyols with lower functionality leads to more elastic materials while the application of higher amounts of chain extender and/or crosslinker as well as the application of polyols having a higher functionality leads to harder and more rigid polyurethanes. Preferably components (a), (b) and (c) are selected in a way that the resulting cured polyurethane has a shore D hardness of more than 50, more preferable more than 60 and most preferable more tan 75.

In one embodiment the mixture of polymeric compounds having at least two isocyanate-reactive hydrogen atoms (b) and chain extenders and/or crosslinkers (c) comprises preferably from 20 to 90% by weight, more preferably from 30 to 60% by weight, of component b1), from 10 to 55% by weight, more preferably from 15 to 50% by weight, of component b2), and 0 to 25% by weight, more preferably from 1 to 20% by weight of chain extender and/or crosslinker c), based in each case on the total weight of components (b) and (c).

Preference is given to using components b1), b2) and c)) in such an amount that the viscosity of a mixture of these substances at 25° C., measured to DIN 53019, has less than 1000 mPas, preferably less than 500 mPas at 25° C. and more preferably from 200 to 400 mPas.

The catalysts (d) used for production of the polyurethane moldings are preferably compounds which significantly accelerate the reaction of the compounds comprising hydroxyl groups of component (b) and optionally (c) with the organic, optionally modified polyisocyanates (a). Examples include amidines such as 2,3-dimethyl-3,4,5,6-tetrahydropyrimidine, tertiary amines such as triethylamine, tributylamine, dimethylbenzylamine, N-methyl-, N-ethyl-, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and preferably 1,4-diazabicyclo[2.2.2]octane, and alkanolamine compounds such as triethanolamine, triisopropanolamine, N-methyl- and N-ethyldiethanolamine and dimethylethanolamine. Likewise useful are organic metal compounds, preferably organic tin compounds, such as tin(II) salts of organic carboxylic acids, e.g. tin(II) acetate, tin(II) octoate, tin(II) ethylhexoate and tin(II) laurate, and the dialkyltin(IV) salts of organic carboxylic acids, for example dibutyltin diacetate, dibutyltin dilaurate, dibutyltin maleate and dioctyltin diacetate, and also bismuth carboxylates such as bismuth(III) neodecanoate, bismuth 2-ethylhexanoate and bismuth octanoate or mixtures thereof. The organic metal compounds can be used alone or preferably in combination with strongly basic amines. If component (b) comprises an ester, preference is given to using exclusively amine catalysts.

Preference is given to using 0.001 to 5% by weight, especially 0.05 to 2% by weight, of catalyst or catalyst combination, based on the weight of component (b).

As assistants and ore additives (e), it is possible to use all auxiliaries and additives known for the production of polyurethanes. Mention may be made of, for example, mold release agents, fillers, dyes, pigments, flame retardants, surface-active substances and hydrolysis inhibitors. Such substances are described, for example, in "Polyurethane Handbook", edited by Günther Oertel, second edition, Hanser Publishers, Munich 1993, chapters 3.4.4 and 3.4.6 to 3.4.11.

Examples of suitable mold release agents are: polysilicones, reaction products of fatty acid esters with polyisocyanates, salts of polysiloxanes comprising amino groups and fatty acids, salts of saturated or unsaturated (cyclo) aliphatic carboxylic acids having at least 8 carbon atoms and tertiary amines and also, in particular, internal mold release agents such as carboxylic esters and/or carboxamides prepared by esterification or amidation of a mixture of montanic acid and at least one aliphatic carboxylic acid having at least 10 carbon atoms with at least bifunctional alkanolamines, polyols and/or polyamines having molecular weights of from 60 to 400 g/mol, as disclosed, for example, in EP 153 639, mixtures of organic amines, metal salts of stearic acid and organic monocarboxylic and/or dicarboxylic acids or their anhydrides, as disclosed, for example, in DE-A 36 07 447, or mixtures of an imino compound, the metal salt of a carboxylic acid and, if appropriate, a carboxylic acid, as disclosed, for example, in U.S. Pat. No. 4,764,537. Preference is given to using a metal salt of stearic acid, particularly preferably zinc stearate, as mold release agent, in particular together with the reactive chain extender. In this case, the zinc stearate is dissolved in the liquid reactive chain extender, preferably the polypropylene oxide having two terminal amino groups.

If mold release agents are used, they are preferably used in amounts of from 10 to 50% by weight, particularly preferably from 30 to 45% by weight, based on the weight of reactive chain extenders.

Fillers, in particular reinforcing fillers, are the customary organic and inorganic fillers, reinforcing materials, etc., known per se. Specific examples are: inorganic fillers such as siliceous minerals, for example quartz flours, sheet silicates such as antigorite, serpentine, hornblendes, amphiboles, chrysotile and talc; metal oxides such as kaolin, aluminum oxides, titanium oxides and iron oxides, metal salts such as chalk, barite and inorganic pigments such as cadmium sulfide, zinc sulfide and also glass and others. Preference is given to using kaolin (china clay), quartz flours, aluminum silicate and coprecipitates of barium sulfate and aluminum silicate and also natural and synthetic fibrous minerals such as wollastonite, metal fibers and glass fibers of various lengths which may, if appropriate, be coated with a size. Examples of possible organic fillers are: carbon, melamine, rosin, cyclopentadienyl resins and graft polymers and also cellulose fibers, polyamide, polyacrylonitrile, polyurethane and polyester fibers based on aromatic and/or aliphatic dicarboxylic esters and in particular carbon fibers.

Preference is given to using fillers having a mean particle diameter of from 0.1 to 500 µm, particularly preferably from 1 to 100 µm and in particular from 1 to 10 µm.

Here, the diameter in the case of nonspherical particles is their dimension along the shortest axis. Preference is given to using glass fibers and quartz flours as fillers. It is also possible to use woven mats such as fiberglass mats or natural fiber mats as fillers.

The inorganic and organic fillers can be used individually or as mixtures and are advantageously used in the reaction mixture in amounts of from 0.5 to 30% by weight, particularly preferably from 10 to 20% by weight, based on the weight of the total reaction mixture.

As additives to adsorb water, preference is given to using aluminosilicates selected from the group consisting of sodium aluminosilicates, potassium aluminosilicates, calcium aluminosilicates, cesium aluminosilicates, barium aluminosilicates, magnesium aluminosilicates, strontium aluminosilicates, sodium aluminophosphates, potassium aluminophosphates, calcium aluminophosphates and mixtures thereof. Particular preference is given to using mixtures of sodium, potassium and calcium aluminosilicates in castor oil as carrier substance.

The additive for absorption of water preferably has a mean particle size of not more than 200 µm, particularly preferably not more than 150 µm and in particular not more than 100 µm. The pore width of the additive used according to the invention for absorption of water is preferably from 2 to 5 Ångström.

When an additive is added for absorption of water, it is preferably added in amounts greater than one part by weight, particularly preferably in the range from 1.2 to 4 parts by weight, based on the total weight of compounds (b) and (c).

If a foamed polyurethane material is desired blowing agents can be applied. Blowing agents preferably comprise water. Blowing agents (d) that can be used comprise well-known compounds having chemical and/or physical effect or mixtures of these blowing agents. Chemical blowing agents are compounds which use reaction with isocyanate to form gaseous products, an example being water or formic acid. Physical blowing agents are compounds which have been emulsified or dissolved in the starting materials for polyurethane production and which vaporize under the conditions of polyurethane formation. By way of example, these involve hydrocarbons, halogenated hydrocarbons, and other compounds, for example perfluorinated alkanes, such as perfluorohexane, chlorofluorocarbons, and ethers, esters, ketones, acetals, and mixtures thereof, for example cyclo) aliphatic hydrocarbons having from 4 to 8 carbon atoms, or fluorocarbons, such as Solkane® 365 mfc from Solvay Fluorides LLC. A preferred embodiment uses, as blowing agent, a mixture comprising at least one of said blowing agents and water, and in particular water as sole blowing agent.

When blowing agent is added it preferably is added in an amount that the resulting polyurethane has an average density of 500 to 1000 kg/m$^3$, more preferably 600 to 800 kg/m$^3$. Preferably no blowing agent is added to produce the insulation component according to the present invention.

If component (e) comprises water as blowing agent generally the compound (e) does not contain any additives to adorb water.

As flame retardants, it is generally possible to use the flame retardants known from the prior art. Suitable flame retardants are, for example, brominated ethers (Ixol B 251), brominated alcohols such as dibromoneopentyl alcohol, tribromoneopentyl alcohol and PHT-4-diol and also chlorinated phosphates such as tris(2-chloroethyl) phosphate, tris (2-chloroisopropyl) phosphate (TCPP), tris(1,3-dichloroisopropyl) phosphate, tris(2,3-dibromopropyl) phosphate and tetrakis(2-chloroethyl) ethylene diphosphate, or mixtures thereof.

Apart from the abovementioned halogen-substituted phosphates, it is also possible to use inorganic flame retardants such as red phosphorus, preparations comprising red phosphorus, expandable graphite, aluminum oxide hydrate, antimony trioxide, arsenic oxide, ammonium polyphosphate and calcium sulfate or cyanuric acid derivatives such as melamine or mixtures of at least two flame retardants such as ammonium polyphosphates and melamine and also, if appropriate, starch for making the rigid polyurethane foams produced according to the invention flame resistant.

As further liquid halogen-free flame retardants, it is possible to use diethyl ethanephosphonate (DEEP), triethyl phosphate (TEP), dimethyl propylphosphonate (DMPP), diphenyl cresyl phosphate (DPC) and others.

For the purposes of the present invention, the flame retardants are preferably used in an amount of from 0 to 60% by weight, particularly preferably from 5 to 50% by weight, in particular from 5 to 40% by weight, based on the total weight of polymeric diol, chain extender, reactive chain extender and catalyst.

To produce the insulation component of the invention, polymeric compound having hydrogen atoms reactive towards isocyanate (b), optionally chain extenders and/or crosslinkers (c), catalysts (d) and optionally other assistants and/or additives (e) mixed with isocyanate (a) to form a reaction mixture, this is introduced into a mold in which an insulating foam material is has been placed the reaction mixture is cured to form the polyurethane elastomer. For this purpose two or more of components (b) to (e) can be premixed to give a polyol component. This polyol component can then be reacted with an isocyanate component comprising isocyanates (a). When reacting polymeric compound having hydrogen atoms reactive towards isocyanate (b), optionally chain extenders and/or crosslinkers (c), catalysts (d) and optionally other assistants and/or additives (e) mixed with isocyanate (a) the isocyanates and the compounds having reactive groups towards isocyanates are preferably reacted in such amounts that the isocyanate index is from 80 to 1000, preferably from 90 to 800 and most preferably from 90 to 120. For the purposes of the present invention, the isocyanate index is the stoichiometric ratio of isocyanate groups to groups which are reactive toward isocyanate multiplied by 100. For the present purposes, groups which are reactive toward isocyanate are all groups which are reactive toward isocyanate and are present in the reaction mixture, including chemical blowing agents but not the isocyanate group itself.

When injecting the reaction mixture into the mould the mould contains an insulating foam material. Preferably the insulating foam material is a polyurethane insulating foam. Such polyurethane insulating foams are well known and for example described in the "Polyurethane Handbook", edited by Günther Oertel, second edition, Hanser Publishers, Munich 1993, chapter 6. Such insulating polyurethane foam usually has a density of 10 to 100 kg/m$^3$, preferably 20 to 60 kg/m$^3$ and a preferably have a thermal conductivity from 20 to 30 mW/mK. In a preferred embodiment the insulating foam material has a content of closed cells of more than 70%, preferably more than 80% and especially more than 90% determined according to DIN EN ISO 4590. Polyurethane insulating foams show good thermal insulation properties and a good adhesion to the outer polyurethane material obtained by curing the reaction mixture according to the present invention.

Preferably the insulating foam material is positioned and fixed in the mould in a manner that the reaction mixture according to the invention can flow around the insulating foam and after curing a 1 to 5 mm thick layer of cured polyurethane mixture is obtained on the surface of the insulation foam material. Preferably at least 50%, more preferably 80 to 100% and most preferably 100% of the surface of the insulation foam material are covered by the layer formed by the cured polyurethane reaction mixture.

The insulation foam material can be produced according to known methods, for example as free rising foam on a moving belt or in a mould. If desired the insulating foam material can be produced in the mould according to the invention. Therefore the polyurethan material to produce the insulation foam material is introduced into the mould and cured. Then the mould is opened a bit to give room for the polyurethane reaction mixture according to the invention and the polyurethane reaction mixture according to the invention is introduced and cured.

Optionally before introducing the polyurethane reaction mixture into the mould an in mould coating and/or a release agent can be applied onto the surface of the mould. Any mould coating and/or a release agent known in the field of polyurethane chemistry known can be applied. Release agents typically are silicon- or wax based. Preferably as mould coating a two component solvent based polyurethane system is applied. Such materials are well known in the art and can protect the insulation component from radiation as IR radiation and prevent discoloration of the polyurethane.

The curing of the reaction mixture according to the invention is preferably effected in a mould at mould temperatures of 20 to 160° C., more preferably 30 to 120 and most preferably 40 to 80° C.

The insulation component according to the invention can be used for all insulation purposes. Preferably an insulation component according to the invention is used as door- or wall component of a cold storing device like a refrigerator.

The insulation component according to the invention can be easily produced within short demould times and has a smooth and regular surface even for complicated geometries. Further the insulation component according to the invention has a low specific weight and the surface shows a high scratch resistance. In addition the insulation component has a high elasticity and low brittleness also at temperatures below 0° C. Further the insulation component according to the invention has good physical properties, including impact resistance, impact strength and water resistance.

The invention is to be illustrated by examples which follow.

Starting Materials
PU insulation rigid foam:
Density: 38 kg/m³, more than 70% closed cells
Thermal conductivityλ: 20 mW/(m×K)
Polyol 1: glycerol initiated polyetherpolyol based on propylene oxide and ethylene oxide having an OH number of 35 and an average functionality of 2.7
Polyol 2: Toluenediamine initiated polyetherpolyol based on propylene oxide and ethylene oxide having an OH number of 390 and an average functionality of 3.8
Polyol 3: glycerol initiated polyetherpolyol based on propylene oxide having an OH number of 400 and an average functionality of 3.0
DEG: Diethyleneglycol
Isocyanate: mixtures of diphenylmethandiisocyanate and polyphenylene polymethylene polyisocyanates, NCO-content 31% by weight.

An insulation component according to the present invention has been produced by the following steps.

In a first step a release agent has been sprayed onto the surface of a mould. Then the PU insulation rigid foam was fixed in the mould and the mould was closed. The mould temperature was set to 60° C. In a third step a PU reaction mixture was produced by mixing the A component and the B component according to table 1 in the weight ratio A:B=100:89 and the reaction mixture was injected into the mould and cured. After a curing time of X minutes (please ad) a seamless insulation component was demoulded. FIG. 1 illustrates the part obtained according to the present example showing a cut through the part produced. In FIG. 1 1 stands for the material obtained by hardening the polyurethane reaction mixture and 2 stands for the polyurethane insulation rigid foam.

TABLE 1

|   |   | Content |
|---|---|---|
|   | A component |   |
| 1 | Polyol 1 | 50.25 |
| 2 | Polyol 2 | 25 |
| 3 | Polyol 3 | 5 |
| 4 | DEG | 18 |
| 5 | Amine catalyst | 0.25 |
| 6 | Water absorber | 1.5 |
|   | B component |   |
| 1 | PMDI | 100 |

The invention claimed is:

1. A process for producing an insulation component, the process comprising:
   I. placing an insulating foam material in a mold, wherein the insulating foam material is a single layer;
   II. mixing
      a) at least one isocyanate compound,
      b) at least one polymeric compound having hydrogen atoms reactive towards isocyanate,
      c) chain extenders and/or crosslinkers comprising (i) an aliphatic, cycloaliphatic or aromatic diol having from 2 to 14 carbon atoms and (ii) a primary amine or a secondary amine, and
      d) at least one catalyst to give a reaction mixture; and
   III. injecting the reaction mixture into the mold and curing the reaction mixture to form a seamless single polyurethane outer layer enclosing the insulating foam,
      wherein the average functionality of the at least one polymeric compound having hydrogen atoms reactive towards isocyanate (b) and the chain extenders and/or crosslinkers (c) and the at least one isocyanate compound (a) is greater than 2.2, and
      wherein the insulation component is for use in a door or wall component for a cold storing device.

2. The process according to claim 1 wherein the at least one polymeric compound having hydrogen atoms reactive towards isocyanate is a polyol.

3. The process according to claim 2 wherein the average functionality of the polyols (b) is in the range from 2.4 to 6.

4. The process according to claim 1 wherein an amine initiated alkoxylation product (b2) is used as the at least one polymeric compound having hydrogen atoms reactive towards isocyanate (b).

5. The process according to claim 1 wherein the primary amine or a secondary amine is diethyltoluenediamine.

6. The process according to claim 1 wherein the isocyanate (a) comprises diphenylmethandiisocyanate or derivatives of diphenylmethandiisocyanate.

7. The process according to claim 1 wherein the at least one isocyanate index is from 90 to 800.

8. The process according to claim 1 wherein an in-mold coating is applied to the foam before injecting the polyurethane reaction mixture into the mold.

9. The process according to claim 1 wherein the insulating foam is a rigid polyurethane foam.

10. The process according to claim 1 wherein the aliphatic, cycloaliphatic or aromatic diol having from 2 to 14 carbon atoms is diethylene glycol.

11. The process according to claim 5 wherein the aliphatic, cycloaliphatic or aromatic diol having from 2 to 14 carbon atoms is diethylene glycol.

12. The process according to claim 1 wherein the at least one polymeric compound having hydrogen atoms reactive towards isocyanate comprises the combination of (i) polyether polyols based on starter molecules having OH groups (b1) and (ii) an amine initiated alkylation product (b2).

13. The process according to claim 5 wherein the at least one polymeric compound having hydrogen atoms reactive towards isocyanate comprises the combination of (i) polyether polyols based on starter molecules having OH groups (b1) and (ii) an amine initiated alkylation product (b2).

14. The process according to claim 11 wherein the at least one polymeric compound having hydrogen atoms reactive towards isocyanate comprises the combination of (i) polyether polyols based on starter molecules having OH groups (b1) and (ii) an amine initiated alkylation product (b2).

* * * * *